United States Patent
Xiong et al.

(10) Patent No.: US 10,871,778 B2
(45) Date of Patent: Dec. 22, 2020

(54) ROBOT CHARGING CONTROL METHOD, APPARATUS, AND ROBOT THEREOF

(71) Applicant: UBTECH Robotics Corp, Shenzhen (CN)

(72) Inventors: Youjun Xiong, Shenzhen (CN); Yongsheng Zhao, Shenzhen (CN); Zhichao Liu, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 176 days.

(21) Appl. No.: 16/195,863

(22) Filed: Nov. 20, 2018

(65) Prior Publication Data

US 2019/0196489 A1    Jun. 27, 2019

(30) Foreign Application Priority Data

Dec. 27, 2017   (CN) .......................... 2017 1 1449355

(51) Int. Cl.
| | | |
|---|---|---|
| G05D 1/02 | (2020.01) | |
| G05D 1/00 | (2006.01) | |
| B60L 53/35 | (2019.01) | |

(52) U.S. Cl.
CPC ............ G05D 1/0225 (2013.01); B60L 53/35 (2019.02); G05D 1/0088 (2013.01); G05D 1/028 (2013.01)

(58) Field of Classification Search
CPC .... G05D 1/0225; G05D 1/0088; G05D 1/028; G05D 1/0214; G05D 1/0221; G05D 1/0276; B60L 53/35; B60L 53/36; B60L 2240/12; B60L 2240/62; B60L 2240/32; B60L 2260/32; H02J 7/00
See application file for complete search history.

(56) References Cited

U.S. PATENT DOCUMENTS

| | | | |
|---|---|---|---|
| 10,278,095 B1 * | 4/2019 | Kothari | B60L 3/04 |
| 10,601,257 B2 * | 3/2020 | Won | H02J 50/40 |
| 2004/0210346 A1 * | 10/2004 | Lee | G06N 3/008 700/245 |
| 2007/0216347 A1 * | 9/2007 | Kaneko | B25J 19/005 320/107 |
| 2017/0203446 A1 * | 7/2017 | Dooley | H04N 5/2257 |
| 2017/0361468 A1 * | 12/2017 | Cheuvront | G06F 3/01 |
| 2018/0173243 A1 * | 6/2018 | Park | G05D 1/0274 |

\* cited by examiner

*Primary Examiner* — Rodney A Butler

(57) ABSTRACT

The present disclosure provides a robot charging control method, apparatus, and robot thereof. The method includes: obtaining a linear distance between a charging portion of the robot and a charging station of a charging device, if a charging instruction is detected; determining polar coordinate information of a preset target position in a polar coordinate system taking the position of the charging portion as a pole based on the linear distance; moving the robot to the preset target position according to the polar coordinate information; rotating the robot in situ at the preset target position to a position the charging portion matching the charging station; and moving the robot from the preset target position to the charging station to establish an electrical connection for charging the robot between the charging portion and the charging station. The present disclosure realizes that a navigation route is unnecessary to be made in advance.

14 Claims, 7 Drawing Sheets

ROBOT CHARGING CONTROL METHOD, APPARATUS, AND ROBOT THEREOF

CROSS REFERENCE TO RELATED APPLICATIONS

This application claims priority to Chinese Patent Application No. 201711449355.9, filed Dec. 27, 2017, which is hereby incorporated by reference herein as if set forth in its entirety.

BACKGROUND

1. Technical Field

The present disclosure relates to robot control technology, and particularly to a robot charging control method, apparatus, and robots thereof.

2. Description of Related Art

With the continuous increase in labor costs, the demand for robots in all walks of life is also increasing. Today's robots are becoming more and more intelligent, which can control the behavior of theirself according to their own needs or environmental conditions. For example, when a robot detects that its own power is not enough, it will be moved to the position of a charging station (of a charging device) and establish an electrical connection relationship with the charging station so as to be charged.

However, in the process of self-charging, the existing robot needs to receive the infrared signal emitted by the charging station, determine the position of the charging station according to the infrared signal and further needs to set the navigation route according to the position of the robot end the position of the charging station. After moving the robot to the neighborhood of the charging station according to the navigation route, it can merely establish an electrical connection relationship with the charging station and be charged after a series of posture adjustments, hence it is too complicated.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

For the purpose of describing the technical solutions of the present disclosure, the following describes through specific embodiments.

Figure 1:
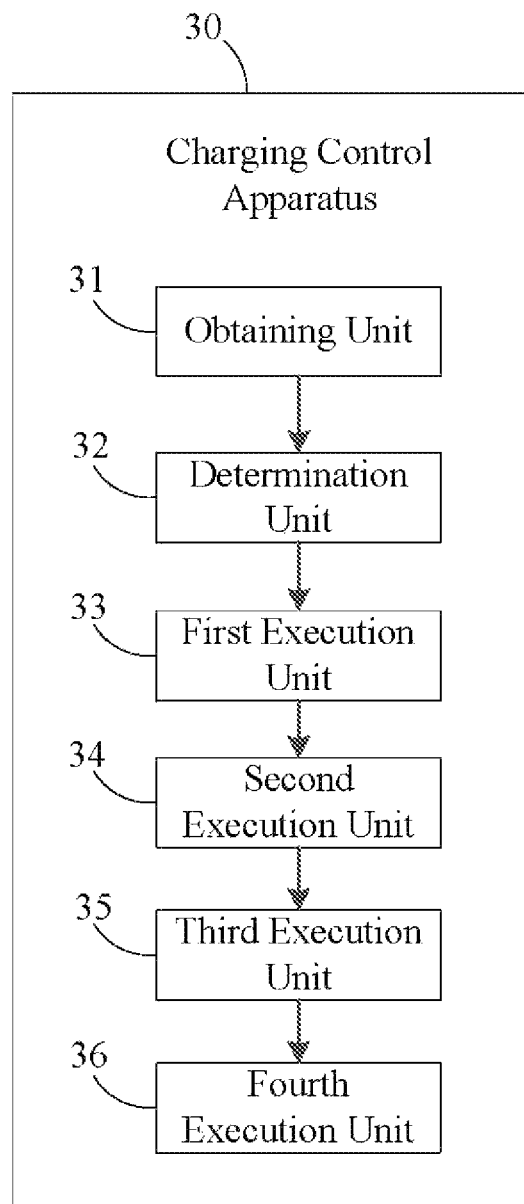
FIG. 1 is a schematic block diagram of an embodiment of a robot charging control apparatus according to the present disclosure.

FIG. 1 is a schematic block diagram of an embodiment of a robot charging control apparatus according to the present disclosure. As shown in FIG. 1, in this embodiment, each unit included in a robot charging control apparatus 30 is utilized to perform each step in an embodiment corresponding to a robot charging control method shown in FIG. 4. For details, refer to the related description in FIG. 4 and the embodiment corresponding to FIG. 4, and are not described herein. In this embodiment, the apparatus 30 includes an obtaining unit 31, a determination unit 32, a first execution unit 33, a second execution unit 34, a third execution unit 35, and a fourth execution unit 36, while each of the units may be implemented in the form of hardware (e.g., a circuit), software (e.g., a program), or a combination thereof (e.g., a circuit with a single chip microcomputer). The apparatus 30 is installed in a robot. In one embodiment, the apparatus 30 may include one or more processors, a storage, and one or more computer programs stored in the storage and executed by the processor, where the one or more computer programs include the above-mentioned units.

The obtaining unit 31 is configured to obtain a linear distance between a charging portion of the robot and a charging station of a charging device, if a charging instruction is detected, where the charging portion is disposed on the robot, and the charging station is disposed on a charging device.

Furthermore, the robot is further provided with a first communication antenna, and the charging device is further provided with a second communication antenna and a third communication antenna, the distance between the second communication antenna and the charging station is equal to the distance between the third communication antenna and the charging station. In this embodiment, the obtaining unit 31 is specifically configured to calculate a first linear distance between the first communication antenna and the second communication antenna based on the height of the first communication antenna and the height of the second communication antenna; calculate a second linear distance between the first communication antenna and the third communication antenna based on the height of the first communication antenna and the height of the third communication antenna; and calculate the linear distance between the charging portion and the charging station based on the distance between the first communication antenna and the charging portion, the first linear distance, and the second linear distance.

Furthermore, in this embodiment, the obtaining unit 31 is specifically configured to:

calculate the first linear distance by the following formula:

$$L_1 = \sqrt{D_1^2 - (H_1 - H_2)^2};$$

where, $L_1$ is the first linear distance; $D_1$ is the length of a height difference reflection between the first communication antenna and the second communication antenna on a horizontal plane; $H_1$ is the height of the first communication antenna, where $H_1 > 0$; $H_2$ is the height of the second communication antenna, where $H_2 > 0$;

calculate the second linear distance by the following formula:

$$L_2 = \sqrt{D_2^2 - (H_1 - H_3)^2};$$

where, $L_2$ is the second linear distance; $D_2$ is the length of a height difference reflection between the first communication antenna and the third communication antenna on a horizontal plane; $H_1$ is the height of the first communication antenna, where $H_1 > 0$; $H_3$ is the height of the third communication antenna, where $H_3 > 0$.

Furthermore, in this embodiment, the obtaining unit 31 is specifically configured to: calculate the linear distance by the following formula:

$$R = S + \frac{(L_1 + L_2)}{2};$$

where, $R$ is the linear distance; $S$ is the distance between the first communication antenna and the charging portion, where $S \geq 0$; $L_1$ is the first linear distance, $L_1 \geq 0$; $L_2$ is the second linear distance, where $L_2 \geq 0$.

The determination unit 32 is configured to determine polar coordinate information of a preset target position in a polar coordinate system which taking the position of the charging portion as a pole based on the linear distance, where the preset target position and the charging station are on a same vertical line.

Furthermore, in this embodiment, the determination unit 32 is specifically configured to: determine a first pole diameter and a second pole diameter in the polar coordinate system, where the first pole diameter is equal to the linear distance, and the second pole diameter is equal to the distance between the charging station and the preset target position; measure and calculate a first polar angle corresponding to the first pole diameter and an included angle between the first pole diameter and the second pole diameter; and measure and calculate polar coordinate information of the target position in the polar coordinate system based on the first polar diameter, the second polar diameter, an angle of the first polar angle, and the included angle.

Furthermore, the polar coordinate information of the preset target position includes a third polar diameter and a second polar angle. In this embodiment, the determination unit 32 is specifically configured to: calculate the polar coordinate information of the preset target position by the following formula:

$$r = \sqrt{R^2 + 1 - 2R\cos(\alpha)}; \text{ and}$$

-continued $$\theta = \begin{cases} \beta + \arccos\left(\frac{R^2 + r^2 - 1}{2 * R * r}\right) \\ \beta - \arccos\left(\frac{R^2 + r^2 - 1}{2 * R * r}\right) \end{cases};$$

where, $r$ is the third polar diameter; $R$ is the first polar diameter; $\alpha$ is the included angle, where $$-\frac{\pi}{2} > \alpha > \frac{\pi}{2};$$

$\theta$ is the second polar angle; $\beta$ is the first polar angle, $-\pi > \beta > \pi$ or $-0 > \beta > 2\pi$.

The first executing unit 33 is configured to move the robot to the preset target position according to the polar coordinate information.

The second executing unit 34 is configured to rotate the robot in situ at the preset target position to a position at which the charging portion matching the charging station.

Furthermore, in this embodiment, the second execution unit 34 is specifically configured to: obtain a plurality of the linear distances while rotating the robot for one turn in situ at the target position; utilize a preset fitting model to fit each of the plurality of linear distances to obtain a plurality of fitting results, where the preset fitting model is a fitting model of a least squares based on sine function, the offset of the sine function is the linear distance, and the amplitude of the sine function is the distance between the first communication antenna and the charging portion; determine the fitting result with a minimum value as a target distance; and rotate the robot to a position at which the linear distance is equal to the target distance, such that charging portion is matched with the charging station.

The third execution unit 35 is configured to move the robot from the preset target position to the charging station to establish an electrical connection for charging the robot between the charging portion and the charging station.

The fourth execution unit 36 is configured to issue an alarm signal and move the robot to the preset target position, if it is detected that the charging voltage is larger than a preset threshold.

As can be seen from the above, in this embodiment, through obtaining a linear distance between a charging portion of the robot and a charging station of a charging device, if a charging instruction is detected; determining polar coordinate information of a preset target position in a polar coordinate system which taking the position of the charging portion as a pole based on the linear distance; moving the robot to the preset target position according to the polar coordinate information; rotating the robot in situ at the preset target position to a position at which the charging portion matching the charging station; and moving the robot from the preset target position to the charging station to establish an electrical connection for charging the robot between the charging portion and the charging station, which realizes that a navigation route is not necessary to be made based on the position between the charging station and the robot in the process of controlling the robot to charge, the process of controlling the robot to charge is simplified, and the charging control efficiency of the robot is improved.

By setting the preset threshold corresponding to the charging voltage of the robot itself, and issuing the alarm signal and moving the robot to the preset target position, which can avoid the damage to the robot that appears when the charging station outputs the wrong charging voltage.

Figure 2:
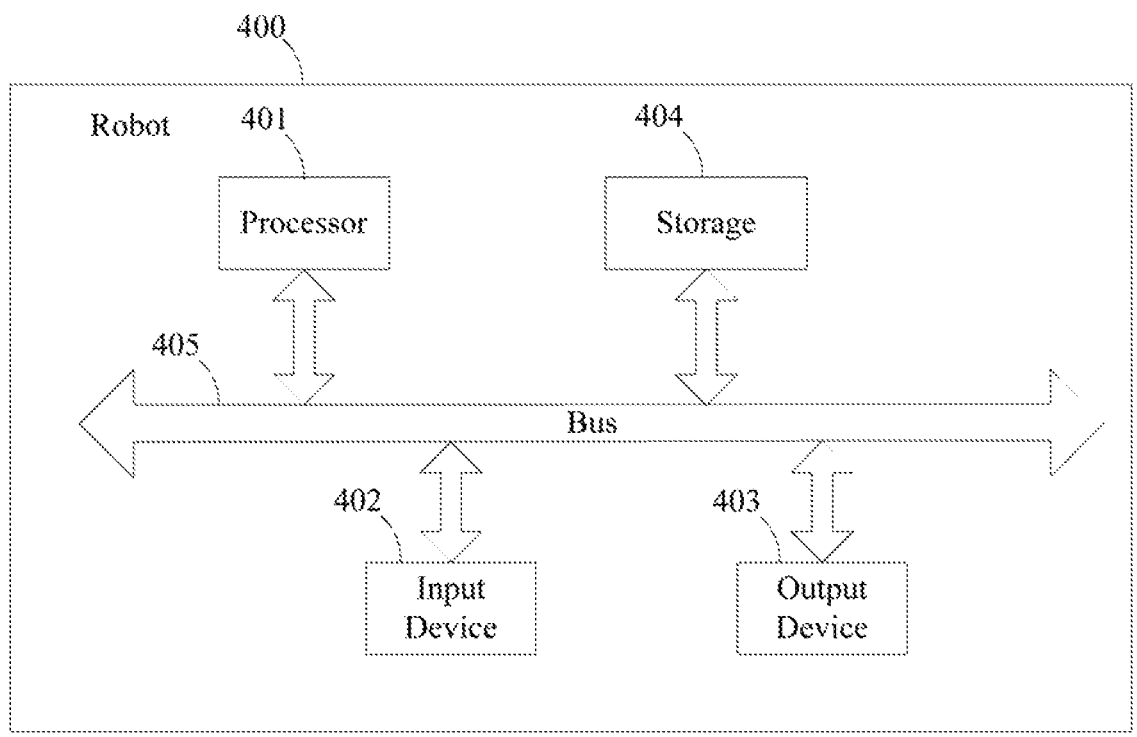
FIG. 2 is a schematic block diagram of an embodiment of a robot according to the present disclosure.

FIG. 2 is a schematic block diagram of an embodiment of a robot according to the present disclosure. As shown in FIG. 2, in this embodiment, a robot 400 may include one or more processors 401; one or more input devices 402, one or more output devices 403, and a storage 404. The above-mentioned processor 401, input device 402, output device 403, and storage 404 are connected by a bus 405. The storage 404 is configured to store one or more computer programs including instructions, and the processor 401 performs the following operations by calling the computer programs stored in the storage 404:

The processor 401 is configured to obtain a linear distance between a charging portion of the robot and a charging station of a charging device, if a charging instruction is detected, where the charging station is disposed on a charging device.

The processor 401 is configured to determine polar coordinate information of a preset target position in a polar coordinate system which taking the position of the charging portion as a pole based on the linear distance, where the preset target position and the charging station are on a same vertical line.

The processor 401 is configured to move the robot to the preset target position according to the polar coordinate information.

The processor 401 is configured to rotate the robot in situ at the preset target position to a position at which the charging portion matching the charging station.

The processor 401 is configured to move the robot from the preset target position to the charging station, establish an electrical connection between the charging portion and the charging station, and perform charging The processor 401 is further configured to: issue an alarm signal and move the robot to the preset target position, if it is detected that the charging voltage is larger than a preset threshold.

Furthermore, the robot is further provided with a first communication antenna, and the charging device is further provided with a second communication antenna and a third communication antenna, the distance between the second communication antenna and the charging station is equal to the distance between the third Communication antenna and the charging station. The processor 401 is specifically configured to: calculate a first linear distance between the first communication antenna and the second communication antenna based on the height of the first communication antenna and the height of the second communication antenna; calculate a second linear distance between the first communication antenna and the third communication antenna based on the height of the first communication antenna and the height of the third communication antenna; and calculate tic linear distance between the charging portion and the charging station based on the distance between the first communication antenna and the charging portion, the first linear distance, and the second linear distance.

The processor 401 is specifically configured to: calculate the first linear distance by the following formula:

$$L_1 = \sqrt{D_1^2 - (H_1 - H_2)^2};$$

where, $L_1$ is the first linear distance; $D_1$ is the length of a height difference reflection between the first communication antenna and the second communication antenna on a horizontal plane; $H_1$ is the height of the first communication antenna, where $H_1>0$; $H_2$ is the height of the second communication antenna, where $H_2>0$;

calculate the second linear distance by the following formula:

$$L_2 = \sqrt{D_2^2 - (H_1 - H_3)^2};$$

where, $L_2$ is the second linear distance; $D_2$ is the length of a height difference reflection between the first communication antenna and the third communication antenna on a horizontal plane; $H_1$ is the height of the first communication antenna, where $H_1>0$; $H_3$ is the height of the third communication antenna, where $H_3>0$.

The processor 401 is specifically configured to calculate the linear distance by the following formula:

$$R = S + \frac{(L_1 + L_2)}{2};$$

where, R is the linear distance; S is the distance between the first communication antenna and the charging portion, where $S \geq 0$; $L_1$ is the first linear distance, $L_1 \geq 0$; $L_2$ is the second linear distance, where $L_2 \geq 0$.

The processor 401 is specifically configured to determine a first pole diameter and a second pole diameter in the polar coordinate system, where the first pole diameter is equal to the linear distance, and the second pole diameter is equal to the distance between the charging station and the preset target position; calculate a first polar angle corresponding to the first pole diameter and an included angle between the first pole diameter and the second pole diameter; and measure and calculate polar coordinate information of the target position in the polar coordinate system based on the first polar diameter, the second polar diameter an angle of the first polar angle, and the included angle.

Furthermore, the polar coordinate information of the preset target position includes a third polar diameter and a second polar angle. The processor 401 is specifically configured to: calculate the polar coordinate information of the preset target position by the following formula:

$$r = \sqrt{R^2 + 1 - 2R\cos(\alpha)}; \text{ and}$$

$$\theta = \begin{cases} \beta + \arccos\left(\frac{R^2 + r^2 - 1}{2*R*r}\right) \\ \beta - \arccos\left(\frac{R^2 + r^2 - 1}{2*R*r}\right) \end{cases};$$

where, r is the third polar diameter; R is the first polar diameter; α is the included angle, where $$-\frac{\pi}{2} > \alpha > \frac{\pi}{2};$$

θ is the second polar angle; β is the first polar angle, $-\pi > \beta > \pi$ or $-0 > \beta > 2\pi$.

The processor 401 is specifically configured to: obtain a plurality of the linear distances while rotating the robot for one turn in situ at the target position; utilize a preset fitting model to fit each of the plurality of linear distances to obtain a plurality of fitting results, where the preset fitting model is a fitting model of a least squares based on sine function, the offset of the sine function is the linear distance, and the amplitude of the sine function is the distance between the first communication antenna and the charging portion; determine the fining result with a minimum value as a target distance; and rotate the robot to a position at which the linear distance is equal to the target distance, such that charging portion is matched with the charging station.

It should be understood that, in this embodiment, the processor 501 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The input device 402 may include a touch panel, a fingerprint sensor (for collecting fingerprint information of the user and direction information of the fingerprint), a microphone, and the like, and the output device 403 may include a display (LCD or the like), a speaker, and the like.

The storage 404 can include read only memory and random access memory and provides instructions and data to the processor 401. A portion of the storage 404 may also include a non-volatile random access memory. For example, the storage 404 may also store information of the device type.

In a embodiment, the processor 401, the input device 402, and the output device 403, which are described in the embodiments of the present disclosure may implement the embodiments of a robot charging control method of the present disclosure (see FIG. 3 and FIG. 4), and may also the embodiment of the robot charging control device of the present disclosure, and details are not described herein again.

Figure 3:
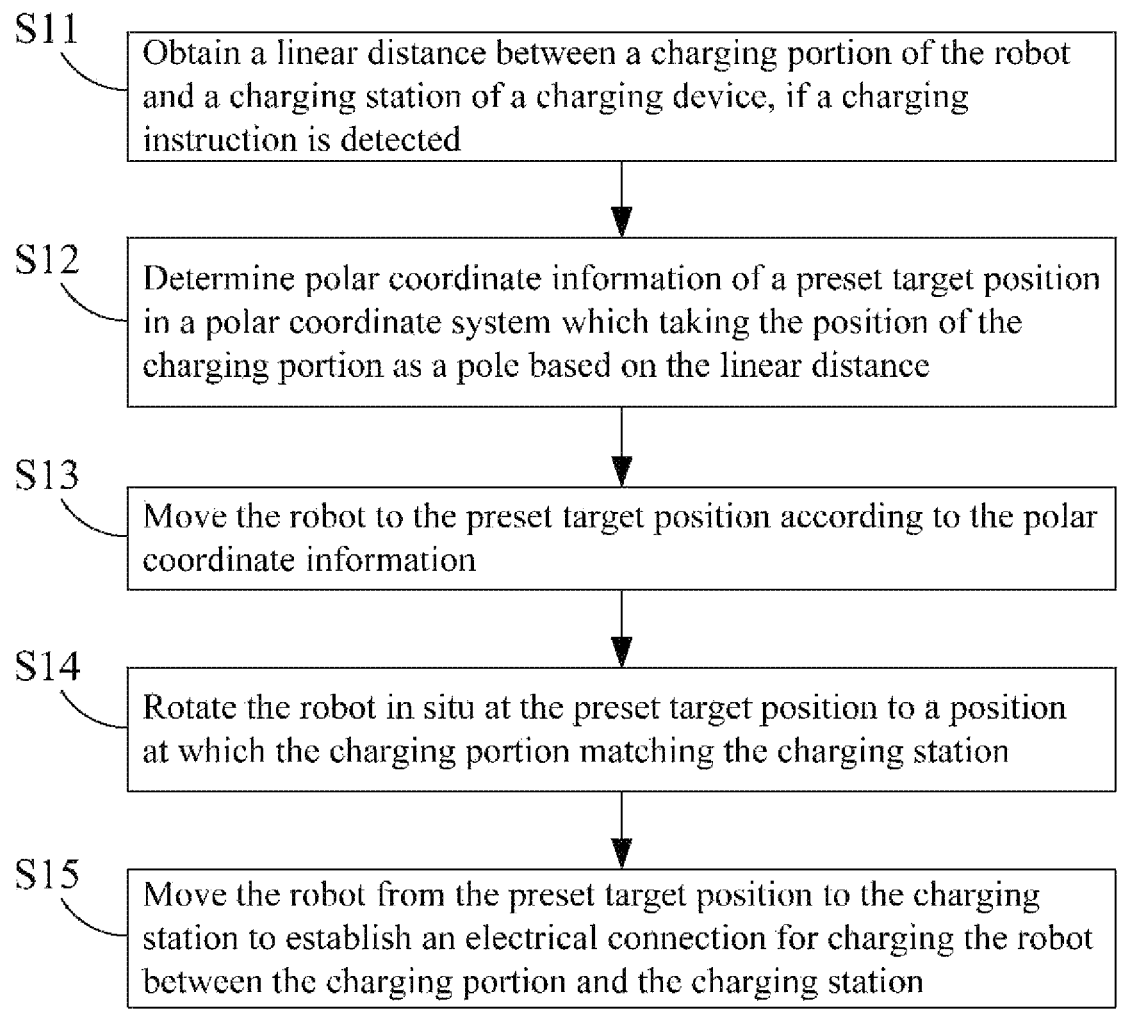
FIG. 3 is a flow chart of an embodiment of a robot charging control method according to the present disclosure.

FIG. 3 is a flow chart of an embodiment of a robot charging control method according to the present disclosure. In one embodiment, the method is a computer-implemented method executable for a processor. The robot charging control method is applied to a robot including the processor. In another embodiments, the method can be implemented through a robot charging control device for a robot. As shown in FIG. 3, the method includes the following steps.

S11: obtaining a linear distance between a charging portion of the robot and a charging station of a charging device, if a charging instruction is detected.

In this embodiment, the charging portion is disposed on the robot, and the charging station is disposed on a charging device. The charging portion may be at least one of a charging interface, a charging coil, a charging contact pad, and a charging contact pole. The charging instruction is utilized to control the robot to electrically connect to the charging station and charge.

In this embodiment, the charging instruction may be a control instruction transmitted by a remote controller of the robot, or a charging control instruction automatically generated when the robot detects that the power is not enough, or a charging standby control instruction generated after the robot executes a task.

In this embodiment, when obtaining the linear distance between the charging portion and the charging station, the linear distance may be a linear distance between the charging portion and the charging station when the robot is in an arbitrary position, or a linear distance between the charging portion and the charging station when the robot is within a preset range in which the charging station is taken as the center.

It should be noted that, in the process of obtaining the linear distance between the charging portion and the charging station, the distance between the position of antenna(s) of the robot and the charging station may be obtained via the antenna(s) of the robot and antenna(s) disposed on the charging device first, and then the linear distance between the charging portion and the charging station may be measured and calculated based on a deviation between the charging portion and the position of the antenna(s) of the robot as well as the distance between the position of the antenna(s) of the robot and the charging station.

In one embodiment, the value of the deviation between the position of the antenna(s) of the robot and the charging portion may be set in advance, that is, the deviation between the position of the antenna(s) of the robot and the charging portion may be known.

It can be understood that, the value of the deviation between the position of the antenna(s) of the robot and the charging portion may be a constant greater than or equal to 0. When the value of the deviation is greater than 0, the antenna(s) of the robot is not in the same position as the charging portion; and when the value of the deviation is equal to 0, the antenna(s) of the robot is in the same position as the charging portion.

S12: determining polar coordinate information of a preset target position in a polar coordinate system which taking the position of the charging portion as a pole based on the linear distance.

In step S12, in the coordinate system, a straight line formed between the preset target position and the position of the charging station is parallel to the longitudinal axis. The preset target position is a position at which the robot adjusts the posture for charging. Before an electrical connection relationship is established between the robot and the charging station, the robot is moved to the preset target position first, and performs posture adjustment in the target position, so that the charging portion can be connected with the charging station.

In this embodiment, the preset target position may be a position of any distance within the area in right ahead of the charging station. In one embodiment, after taking the charging station as a starting point, it can define the position of any distance in right ahead of the charging station as the position for adjusting the posture, that is, to define the preset target position.

It should be noted that, since the preset target position is within the range in right ahead of the charging station, the distance between the preset target position and the charging station is a known constant.

For example, the preset target position may lie a position within a range of 2 meters to 1 meter in right ahead of the charging station.

It can be understood that, in one embodiment, the setting of the preset target position can be determined according to the size of the robot itself.

S13: moving the robot to the preset target position according to the polar coordinate information.

In step S13, the polar coordinate information is utilized to describe the positional relationship between the preset target position and the pole, that is, the positional relationship between the preset target position and the charging portion of the robot.

In this embodiment, a route of the robot to move from a position to the preset target position can be determined based on the polar coordinate information.

It should be noted that, since the polar coordinate system is established with the position of the charging portion as the pole, the polar coordinate information is utilized to describe the positional relationship between the preset target position and the pole, that is, the polar diameter in the polar coordinate information is utilized to describe the distance between the preset target position and the charging portion. In one embodiment, if there is an obstacle between the robot and the preset target position, the route of moving the robot to the preset target distance can be segmented so as to bypass the obstacle.

In one embodiment, the robot will deviate in the process of moving to the preset target position according to the polar coordinate information. By measuring and calculating the deviation amount and controlling the robot to fine-tune, the robot can be guaranteed to be moved to the preset target position smoothly. When determining whether the robot is moved to the target position, the distance between the charging portion and the charging station can be obtained through the (current) position of the robot. If the distance is equal to the distance between the charging station and the preset target position, the position of the robot is determined as the preset target position. If the distance is less than or greater than the distance between the charging station and the preset target position, it is determined that the position of the robot is not the preset target position.

In this embodiment, the route of moving the robot to the preset target distance is segmented, and new coordinate information with respect to the preset target position is re-obtained at the initial position of the different route segments, thereby avoiding the collision between the robot and the obstacle, while the robot can be moved to the preset target position with the shortest path.

For example, if the route is segmented into two routes, the new coordinate information of the preset target position is re-determined based on the polar coordinate information measured at the pole after the first is traveled, and then the movement on the second route is performed based on the new coordinate information, thereby bypassing the obstacle and reaching the preset target position.

S14: rotating the robot in situ at the preset target position to a position at which the charging portion matching the charging station.

In step S14, the position at which the charging portion matches the charging station means a position of the robot corresponding to the target position which the charging portion of the robot and the charging station can be matched and aligned to charge the robot.

Taking a charging interface as the charging portion as an example, the rotating the robot in situ at the preset target position to the position at which the charging portion matching the charging station is that rotating the robot in situ at the preset target position to a position at which the charging interface can match the charging station, that is, if the robot is moved from the preset target position to the charging station in the current posture, the charging interface can be directly connected with a power supply part of the charging station.

In this embodiment, the angle of rotating the robot in situ at the preset target position may be 180 degrees or 360 degrees. In the process of controlling the robot to rotate, different rotation angle recording strategies may be configured according to the movement manner of the robot. For example, for a non-wheeled robot, the recording of the rotation angles can be performed through an inertial measurement unit (IMU), a plurality of linear distances between the charging portion and the charging station are obtained, a minimum linear distance is obtained from the plurality of linear distances, a rotation angle corresponding to the minimum distance is determined, and then the robot is rotated to an angle corresponding to the minimum linear distance, thereby realizing the matching and alignment of the charging portion of the robot with the charging station, or using a visual odometer to position and navigate. For another example, for a wheeled robot, a chassis odometer can be used to obtain the offset of the position and the angle, thereby achieving the matching and alignment of the charging portion of the robot with the charging station. It should be noted that, the IMU is a device for measuring the three-axis posture angle, angular rate or angular acceleration of a moving object. During rotating the robot in-situ at the preset target position, multiple angles in the process of rotation is recorded through the IMU, and then the plurality of angles is corresponded to a plurality of linear distances between the charging portion and the charging station. When the minimum value in the plurality of linear distances is determined, the robot can be rotated to the position at which the charging portion matches the charging station based on a correspondence between the angle and the straight line distance.

S15: moving the robot from the preset target position to the charging station to establish an electrical connection for charging the robot between the charging portion and the charging station.

In step S15, during moving the robot from the preset target position to the charging station, charging specification information of the robot may be simultaneously transmitted to a charging device in which the charging station is located, so that the charging device configures a corresponding charging voltage for the charging station.

In this present embodiment in order to enable the robot to charge in a timely manner when the pow is low, the moving speed of the robot can be set according to the remaining power of the robot in the process of controlling the robot to charge.

For example, the threshold of the remaining power can be set in advance, and when the remaining power of the robot is greater than or equal to the threshold, the robot is moved from the preset target position to the charging station at a first speed, and when the remaining power of the robot is less than the threshold, the robot is moved from the preset target position to the charging station at a second speed, where the second speed is greater than the first speed.

Simultaneously, in order to avoid the collision between the robot and the charging device due to inertia, the second speed is less than a third speed during moving the robot from the preset target position to the charging station, where the third speed is a speed of the robot when moving the robot to the preset target position according to the polar coordinate information.

As can be seen from the above, in this embodiment, through obtaining a linear distance between a charging portion of the robot and a charging station, if a charging instruction is detected; determining polar coordinate information of a preset target position in a polar coordinate system which taking the position of the charging portion as a pole based on the linear distance; moving the robot to the preset target position according to the polar coordinate information; rotating the robot in situ at the preset target position to a position at which the charging portion matching the charging station; and moving the robot from the preset target position to the charging station to establish an electrical connection for charging the robot between the charging portion and the charging station, which realizes that a navigation route is not necessary to be made based on the position between the charging station and the robot in the process of controlling the robot to charge, the process of controlling the robot to charge is simplified, and the charging control efficiency of the robot is improved.

Figure 4:
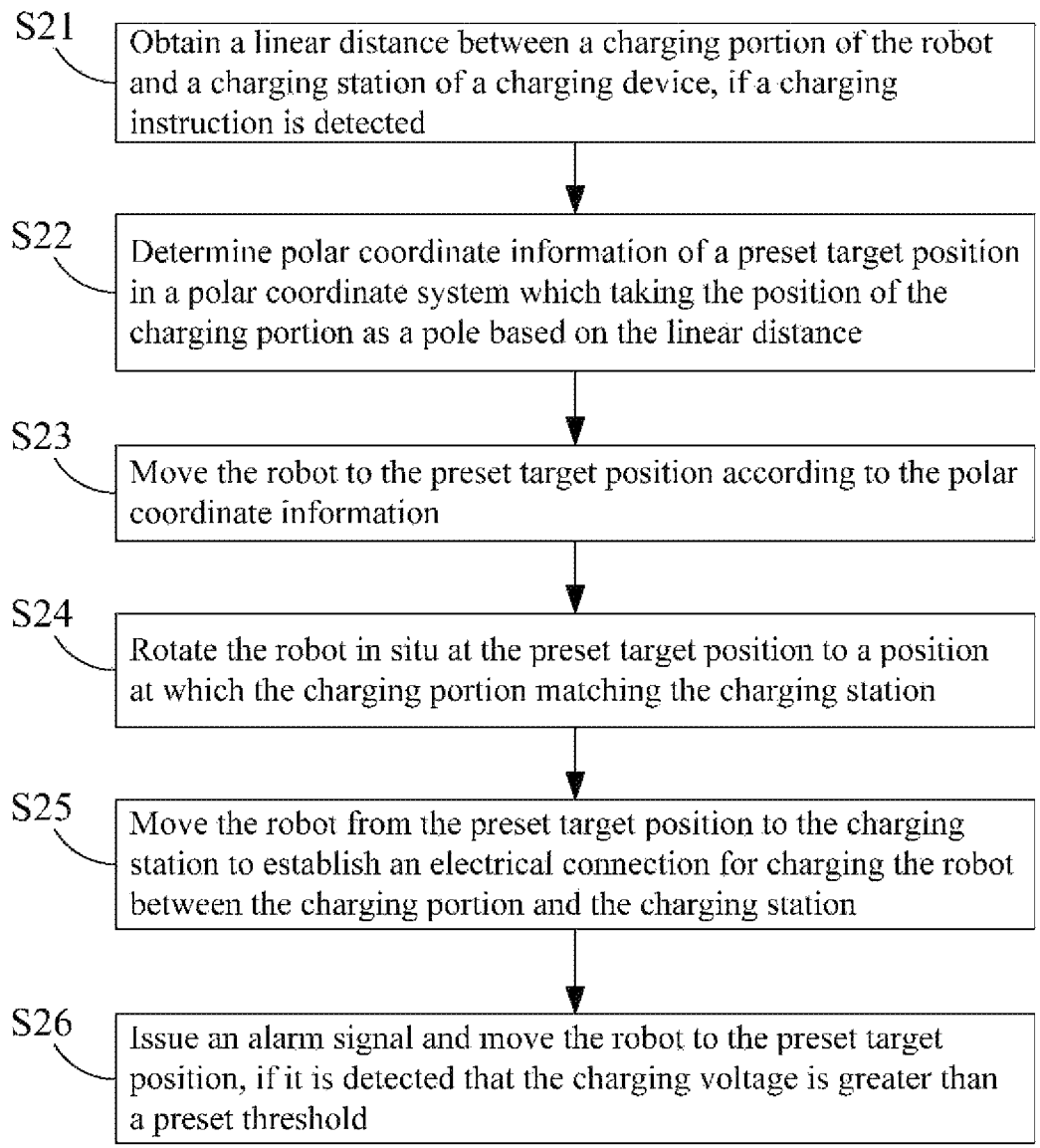
FIG. 4 is a flow chart of another embodiment of a robot charging control method according to the present disclosure.

FIG. 4 is a flow chart of another embodiment of a robot charging control method according to the present disclosure. This embodiment is based on the previous embodiment, which further defines the steps after the step of moving the robot from the preset target position to the charging station. As shown in FIG. 4, the method includes the following steps.

S21: obtaining a linear distance between a charging portion of the robot and a charging station of a charging device, if a charging instruction is detected.

In this embodiment, the charging portion is disposed on the robot, and the charging station is disposed on a charging device. The charging portion may be at least one of a charging interface, a charging coil, a charging contact pad, and a charging contact pole. The charging instruction is utilized to control the robot to electrically connect to the charging station and charge.

In this embodiment, the charging instruction may be a control instruction transmitted by a remote controller of the robot, or a charging control instruction automatically generated when the robot detects that the power is not enough, or a charging standby control instruction generated after the robot executes a task.

In this embodiment, step S21 specifically includes:

calculating a first linear distance between the first communication antenna and the second communication antenna based on the height of the first communication antenna and the height of the second communication antenna; calculating a second linear distance between the first communication antenna and the third communication antenna based on the height of the first communication antenna and the height of the third communication antenna; and calculating the linear distance between the charging portion and the charging station based on the distance between the first communication antenna and the charging portion, the first linear distance, and the second linear distance.

Figure 5:
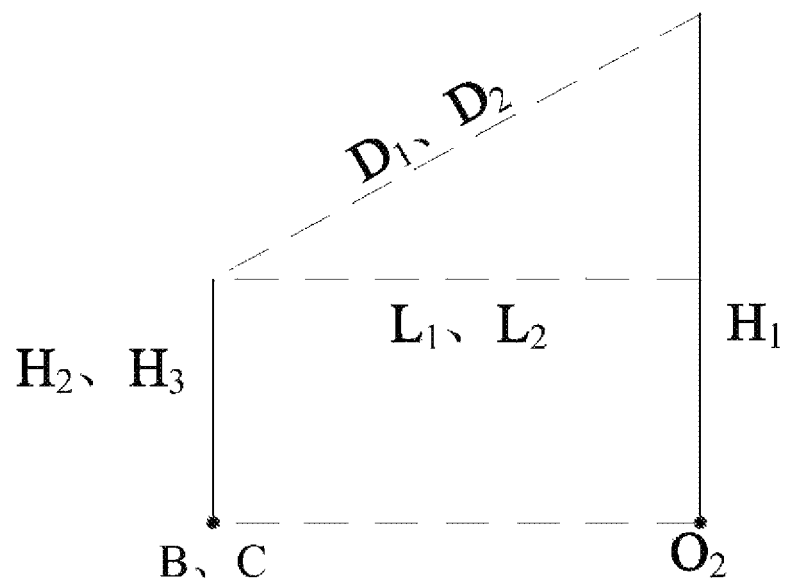
FIG. 5 is a schematic diagram of a process of calculating a first linear distance and calculating a second linear distance.

FIG. 5 is a schematic diagram of a process of calculating a first linear distance and calculating a second linear distance. As shown in FIG. 5, node O2 is a first communication antenna of the robot, node B is a second communication antenna, and node C is a third communication antenna.

Furthermore, in this embodiment the step of calculating the first linear distance between the first communication antenna and the second communication antenna based on the height of the first communication antenna and the height of the second communication antenna includes:

calculating the first linear distance by the following formula:

$$L_1 = \sqrt{D_1^2 - (H_1 - H_2)^2};$$

where, $L_1$ is the first linear distance; $D_1$ is the length of a height difference reflection between the first communication antenna and the second communication antenna on a horizontal plane; $H_1$ is the height of the first communication antenna, where $H_1 > 0$; $H_2$ is the height of the second communication antenna, where $H_2 > 0$.

Furthermore, in this embodiments the step of calculating the second linear distance between the first communication antenna and the third communication antenna based on the height of the first communication antenna and the height of the third communication antenna includes:

measuring and calculating the second linear distance by the following formula:

$$L_2 = \sqrt{D_2^2 - (H_1 - H_3)^2};$$

where, $L_2$ is the second linear distance; $D_2$ is the length of a height difference reflection between the first communication antenna and the third communication antenna on a horizontal plane; $H_1$ is the height of the first communication antenna, where $H_1 > 0$; $H_3$ is the height of the third communication antenna, where $H_2 > 0$.

Figure 6:
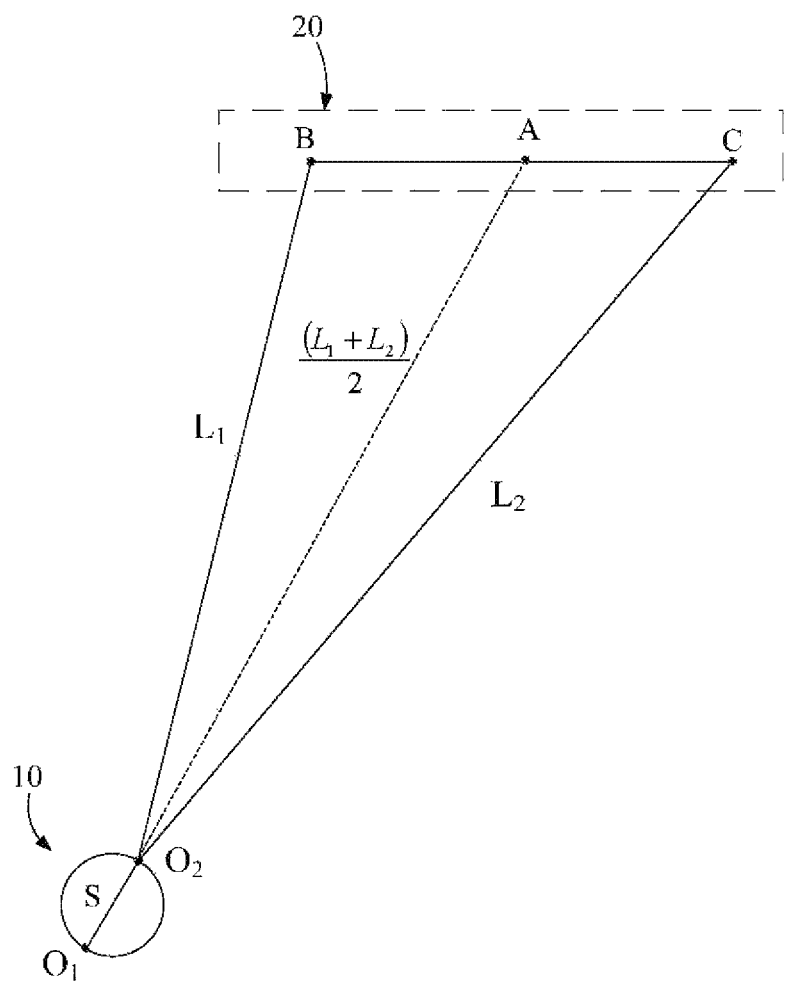
FIG. 6 is a schematic diagram of the positions of the charging device and the robot.

FIG. 6 is a schematic diagram of the positions of the charging device and the robot. As shown in FIG. 6, in this embodiment, the robot 10 is provided with a charging portion $O_1$ and a first communication antenna $O_2$, and a charging device 20 is provided with a charging station A, a second communication antenna B, and a third communication antenna C, where the distance between the second communication antenna B and the charging station A is equal to the distance between the third communication antenna C and the charging station A.

Furthermore, in this embodiment, the step of calculating the linear distance between the charging portion and the charging station based on the distance between the first communication antenna and the charging portion, the first linear distance, and the second linear distance includes:

calculating the linear distance by the following formula:

$$R = S + \frac{(L_1 + L_2)}{2};$$

where, R is the linear distance; S is the distance between the first communication antenna and the charging portion, where $S \geq 0$; $L_1$ is the first linear distance, $L_1 \geq 0$; $L_2$ is the second linear distance, where $L_2 \geq 0$.

It should be noted that, if the distance S between the first communication antenna $O_2$ and the charging portion $O_1$ is equal to 0, the charging portion $O_1$ and the first communication antenna $O_2$ are at the same position.

S22: determining polar coordinate information of a preset target position in a polar coordinate system which taking the position of the charging portion as a pole based on the linear distance, where the preset target position and the charging station are on a same vertical line.

In step S22, in the coordinate system, a straight line formed between the preset target position and the position of the charging station is parallel to the longitudinal axis. The preset target position is a position at which the robot adjusts the posture for charging. Before an electrical connection relationship is established between the robot and the charging station, the robot is moved to the preset target position first, and performs posture adjustment in the target position, so that the charging portion can be connected with the charging station.

In this embodiment, the preset target position may be a position of any distance within the area in right ahead of the charging station. In one embodiment, after taking the charging station us a starling point, it can define the position of any distance in right ahead of the charging station as the position for adjusting the posture, that is, to define the preset target position.

Figure 7:
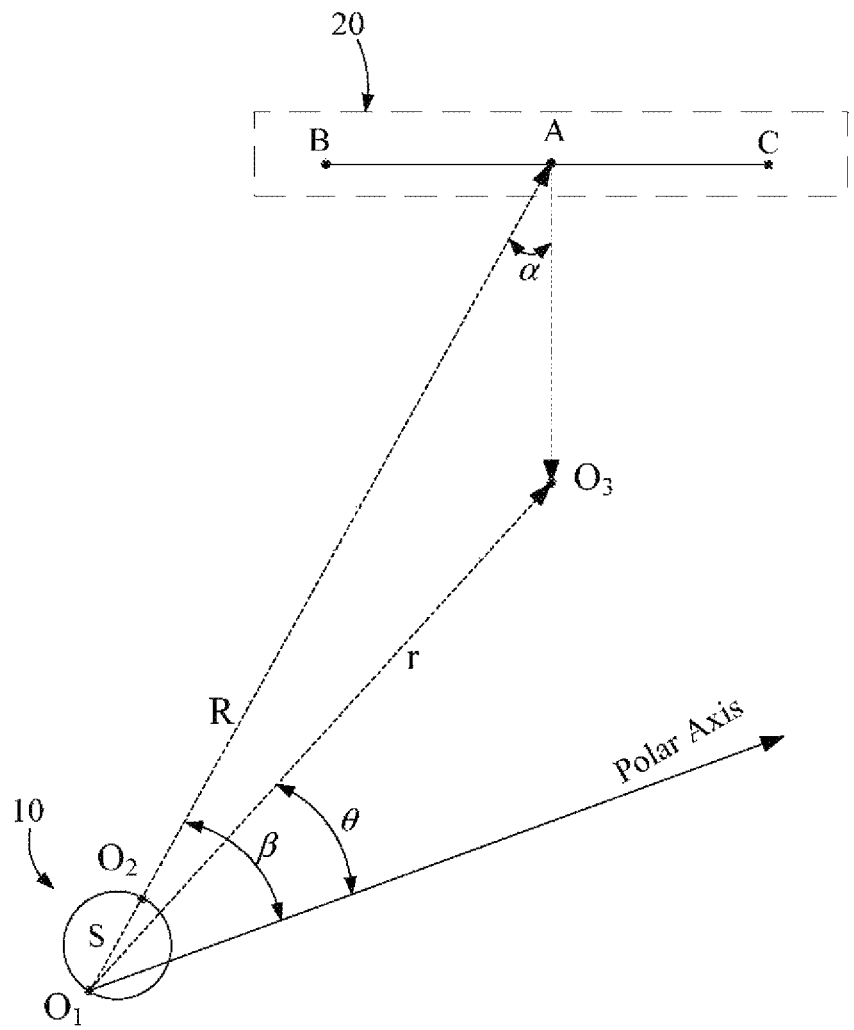
FIG. 7 is a schematic diagram of the positions of the first communication antenna, the second communication antenna, the third communication antenna, the charging station, and the charging portion in a polar coordinate.

FIG. 7 is a schematic diagram of the positions of the first communication antenna, the second communication antenna, the third communication antenna, the charging station, and the charging portion in a polar coordinate.

As shown in FIG. 7, in this embodiment, step S22 specifically includes: determining a first pole diameter and a second pole diameter in the polar coordinate system, where the first pole diameter is equal to the linear distance, and the second pole diameter is equal to the distance between the charging station and the preset target position; measuring and calculating a first polar angle corresponding to the first pole diameter and an included angle between the first pole diameter and the second pole diameter; and measuring and calculating polar coordinate information of the target position in the polar coordinate system based on the first polar diameter, the second polar diameter, an angle of the first polar angle, and the included angle.

As shown in FIG. 7, $O_3$ is a preset target position, the first pole diameter $O_1A$ is equal to the linear distance R, and the second pole diameter $AO_3$ is equal to the distance between the preset target positions.

Furthermore, in this embodiment, the polar coordinate information of the preset target position includes a third polar diameter and a second polar angle.

The step of measuring and calculating the polar coordinate information of the target position in the polar coordinate system based on the first polar diameter, the second polar diameter, the first polar angle, and the included angle includes:

calculating the polar coordinate information of the preset target position by the following formula:

$$r = \sqrt{R^2 + 1 - 2R\cos(\alpha)}\text{; and}$$

$$\theta = \begin{cases} \beta + \arccos\left(\dfrac{R^2 + r^2 - 1}{2*R*r}\right) \\ \beta - \arccos\left(\dfrac{R^2 + r^2 - 1}{2*R*r}\right) \end{cases};$$

where, r is the third polar diameter, R is the first polar diameter; α is the included angle, where $$-\frac{\pi}{2} > \alpha > \frac{\pi}{2};$$

θ is the second polar angle; β is the first polar angle, $-\pi<\beta<\pi$ or $-0>\beta>2\pi$.

It should be noted that, the first polar angle β may be the angle of the polar axis to be rotated to the position where the linear distance is R which is measured by the IMU after determining the linear distance R. Since the distance between the preset target position $O_3$ and the charging station A is a known value, it may be obtained by measuring the included angle between the two polar diameters after directly drawing the first pole diameter and the second pole diameter in the polar coordinate, if the first pole diameter is equal to the linear distance R.

S23: moving the robot to the preset target position according to the polar coordinate information.

In step S23, the polar coordinate information is utilized to describe the positional relationship between the preset target position and the pole, that is, the positional relationship between the preset target position and the charging portion of the robot.

In this embodiment, a route of the robot to move from a position to the preset target position can be determined based on the polar coordinate information.

It should be noted that, since the polar coordinate system is established with the position of the charging portion as the pole, the polar coordinate information is utilized to describe the positional relationship between the preset target position and the pole, that is, the polar diameter in the polar coordinate information is utilized to describe the distance between the preset target position and the charging portion.

In one embodiment, if there is an obstacle between the robot and the preset target position, the route of moving the robot to the preset target distance can be segmented so as to bypass the obstacle.

In this embodiment, the route of moving the robot to the preset target distance is segmented, and new coordinate information with respect to the preset target position is re-obtained at the initial position of the different route segments, thereby avoiding the collision between the robot and the obstacle, while the robot can be moved to the preset target position with the shortest path.

For example, if the route is segmented into two routes, the new coordinate information of the preset target position is re-determined based on the polar coordinate information measured at the pole after the first route is traveled, and then the movement on the second route is performed based on the new coordinate information, thereby bypassing the obstacle and reaching the preset target position.

S24: rotating the robot in situ at the preset target position to a position at which the charging portion matching the charging station.

In step S24, the position at which the charging portion matches the charging station means a position of the robot corresponding to the target position which the charging portion of the robot and the charging station can be matched and aligned to charge the robot.

In this embodiment, step S24 specifically includes: obtaining a plurality of the linear distances while rotating the robot for one turn in situ at the target position; utilizing a preset fitting model to fit each of the plurality of linear distances to obtain a plurality of fitting results, where the preset fitting model is a fitting model of a least squares based on sine function, the offset of the sine function is the linear distance, and the amplitude of the sine function is the distance between the first communication antenna and the charging portion; determining the fitting result with a minimum value as a target distance; and rotating the robot to a position where the linear distance is equal to the target distance, such that charging portion is matched with the charging station.

It should be noted that, the rotating the robot in situ at the preset target position means controlling the robot to rotate for one turn on its own central axis. The preset fitting model is a preset fitting model of a least squares based on sine function, where the least squares is also called a least square method, which can be used to find the best function matching of data by minimizing the sum of squared errors. In this embodiment, in the tilting model of a least squares based on sine function, the offset of the sine function is a linear distance, and the amplitude of the sine function is the distance between the first communication antenna and the charging portion.

When controlling the charging portion of the robot to match and align with the charging station, since the random error of the linear distance measured by rotating the robot in-situ is large, in order to reduce the influence of the error on the control, a plurality of linear distances are processed separately by utilizing the preset fitting model, which can obtain a plurality of linear distances quickly, and the sum of the squares of the errors between the plurality of obtained linear distances and the actual distance is minimized, and the control precision is improved.

It can be understood that, in one embodiment, those skilled in the art may modify the basic formula of the least squares according to actual needs of ranging, for example, adding or deleting corresponding calculation factors based on the basic formula, or modifying the factors, the range of factors, or the like in the basic formula, thereby obtaining the least squares fitting model based on sine function, and the model can fit the multiple linear distances separately.

S25: moving the robot from the preset target position to the charging station to establish an electrical connection for charging the robot between the charging portion and the charging station.

It is to be understood that, the step S25 in the embodiment is the same as the specific implementation manner of the step S15 in the above-mentioned embodiment. For details, refer to the detailed description of the step S15, and are not described herein.

S26: issuing an alarm signal and moving the robot to the preset target position, if it is detected that the charging voltage is greater than a preset threshold.

In step S26, the alarm signal is utilized to alert for the excessive output voltage of the charging station.

In one embodiment, one charging station can charge a plurality of robots. During a same period of time, there may be multiple robots simultaneously transmitting a charging handshake signal to the charging station, and the charging station outputs charging voltages according to different charging handshake signals. Since different robots have different charging voltages, the preset threshold is set corresponding to the charging voltage of the robot itself, and the alarm signal is issued and the robot is moved to the preset target position if the charging voltage is detected to be greater than the preset threshold, which can avoid the damage to the robot that appears when the charging station outputs the wrong charging voltage.

It can be understood that, if the charging voltage is detected to be equal to or less than the preset threshold, no operation is performed.

As can be seen from the above, in this embodiment, through obtaining a linear distance between a charging portion of the robot and a charging station of a charging device, if a charging instruction is detected; determining polar coordinate information of a preset target position in a polar coordinate system which taking the position of the charging portion as a pole based on the linear distance; moving the robot to the preset target position according to the polar coordinate information; rotating the robot in situ at the preset target position to a position at which the charging portion matching the charging station; and moving the robot from the preset target position to the charging station to establish an electrical connection for charging the robot between the charging portion and the charging station, which realizes that a navigation route is not necessary to be made based on the position between the charging station and the robot in the process of controlling the robot to charge, the process of controlling the robot to charge is simplified, and the charging control efficiency of the robot is improved.

By setting the preset threshold corresponding to the charging voltage of the robot itself, and issuing the alarm signal and moving the robot to the preset target position, which can avoid the damage to the robot that appears when the charging station outputs the wrong charging voltage.

In another embodiment of the present disclosure, a computer readable storage medium is provided. The computer readable storage medium stores one or more computer programs. When executed by a processor, the one or more computer program implements:

obtaining a linear distance between a charging portion of the robot and a charging station of a charging device, in response to detecting a charging instruction, where the charging station is disposed on a charging device;

determining polar coordinate information of a preset target position in a polar coordinate system which taking the position of the charging portion as a pole based on the linear distance, where the preset target position and the charging station are on a same vertical line;

moving the robot to the preset target position according to the polar coordinate information;

rotating the robot in situ at the preset target position to a position at which the charging portion matching the charging station; and moving the robot from the preset target position to the charging station to establish an electrical connection for charging the robot between the charging portion and the charging station.

When executed by a processor, the one or more computer program further implements:

issuing an alarm signal and moving the robot to the preset target position, if it is detected that the charging voltage is greater than a preset threshold.

Furthermore, the robot is further provided with a first communication antenna, and the charging device is further provided with a second communication antenna and a third communication antenna, the distance between the second communication antenna and the charging station is equal to the distance between the third communication antenna and the charging station. When executed by a processor, the one or more computer program further implements:

calculating a first linear distance between the first communication antenna and the second communication antenna based on the height of the first communication antenna and the height of the second communication antenna;

calculating a second linear distance between the first communication antenna and the third communication antenna based on the height of the first communication antenna and the height of the third communication antenna; and calculating the linear distance between the charging portion and the charging station based on the distance between the first communication antenna and the charging portion, the first linear distance, and the second linear distance.

When executed by a processor, the one or more computer program further implements:

calculating the first linear distance by the following formula:

$$L_1=\sqrt{D_1^2-(H_1-H_2)^2};$$

where, $L_1$ is the first linear distance; $D_1$ is the length of a height difference reflection between the first communication antenna and the second communication antenna on a horizontal plane; $H_1$ is the height of the first communication antenna, where $H_1>0$; $H_2$ is the height of the second communication antenna, where $H_2>0$;

where the calculating the second linear distance between the first communication antenna and the third communication antenna based on the height of the first communication antenna and the height of the third communication antenna includes:

calculating the second linear distance by the following formula:

$$L_2=\sqrt{D_2^2-(H_1-H_3)^2};$$

where, $L_2$ is the second linear distance; $D_2$ is the length of a height difference reflection between the first communication antenna and the third communication antenna on a horizontal plane; $H_1$ is the height of the first communication antenna, where $H_1>0$; $H_3$ is the height of the third communication antenna, where $H_3>0$.

When executed by a processor, the one or more computer program further implements:
calculating the linear distance by the following formula:

$$R = S + \frac{(L_1 + L_2)}{2};$$

where, R is the linear distance; S is the distance between the first communication antenna and the charging portion, where S≥0; $L_1$ is the first linear distance, $L_1$≥0; $L_2$ is the second linear distance, where $L_2$≥0.

When executed by a processor, the one or more computer program further implements:
determining a first pole diameter and a second pole diameter in the polar coordinate system, where the first pole diameter is equal to the linear distance, and the second pole diameter is equal to the distance between the charging station and the preset target position;
calculating a first polar angle corresponding to the first pole diameter and an included angle between the first pole diameter and the second pole diameter; and
measuring and calculating polar coordinate information of the target position in the polar coordinate system based on the first polar diameter, the second polar diameter, an angle of the first polar angle, and the included angle.

Furthermore, the polar coordinate information of the preset target position includes a third polar diameter and a second polar angle. When executed by a processor, the one or more computer program further implements:
calculating the polar coordinate information of the preset target position by the following formula:

$$r = \sqrt{R^2 + 1 - 2R\cos(\alpha)}\text{; and}$$

$$\theta = \begin{cases} \beta + \arccos\left(\frac{R^2 + r^2 - 1}{2*R*r}\right) \\ \beta - \arccos\left(\frac{R^2 + r^2 - 1}{2*R*r}\right) \end{cases};$$

where, r is the third polar diameter; R is the first polar diameter; α is the included angle, where $$-\frac{\pi}{2} > \alpha > \frac{\pi}{2};$$

θ is the second polar angle; β is the first polar angle, $-\pi > \beta > \pi$ or $-0 > \beta > 2\pi$.

When executed by a processor, the one or more computer program further implements:
obtaining a plurality of the linear distances while rotating the robot for one turn in situ at the target position;
utilizing a preset fitting model to fit each of the plurality of linear distances to obtain a plurality of fitting results, where the preset fitting model is a fitting model of a least squares based on sine function, the offset of the sine function is the linear distance, and the amplitude of the sine function is the distance between the first communication antenna and the charging portion;
determining the fitting result with a minimum value as a target distance; an
rotating the robot to a position at which the linear distance is equal to the target distance, such that charging portion is matched with the charging station.

As can be seen from the above, in this embodiment, through obtaining a linear distance between a charging portion of the robot and a charging station of a charging device, if a charging instruction is detected; determining polar coordinate information of a preset target position in a polar coordinate system which taking the position of the charging portion as a pole based on the linear distance; moving the robot to the preset target position according to the polar coordinate information; rotating the robot in situ at the preset target position to a position at which the charging portion matching the charging station; and moving the robot from the preset target position to the charging station to establish an electrical connection for charging the robot between the charging portion and the charging station, which realizes that a navigation route is not necessary to be made based on the position between the charging station and the robot in the process of controlling the robot to charge, the process of controlling the robot to charge is simplified, and the charging control efficiency of the robot is improved.

By setting the preset threshold corresponding to the charging voltage of the robot itself, and issuing the alarm signal and moving the robot to the preset target position, which can avoid the damage to the robot that appears when the charging station outputs the wrong charging voltage.

The computer readable storage medium may be an internal storage unit of the device of any of the above-mentioned embodiment, for example, a hard disk or a memory of a computer. The computer readable storage medium may also be an external storage device of the device, for example, a plug-in hard disk, a smart media card (SMC), a secure digital (SD) card, flash card, and the like, which is equipped on the device. Furthermore, the computer readable storage medium may further include both an internal storage unit and an external storage device, of the device. The computer readable storage medium is configured to store the computer program and other programs and data required by the device. The computer readable storage medium may also be used to temporarily store data that has been or will be output.

Those ordinary skilled in the art may clearly understand that, the exemplificative units and steps described in the embodiments disclosed herein may be implemented through electronic hardware, computer software, or a combination of the two. In order to clearly illustrate the interchangeability of hardware and software, the composition and steps of the examples have been generally described in terms of functions in the above-mentioned description. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

Those skilled in the art may clearly understand that, for the convenience and simplicity of description, for the specific operation process of the above-mentioned device and units, reference may be made to the corresponding processes in the above-mentioned method embodiments, and are not described herein.

In the several embodiments provided by the present disclosure, it should be understood that the disclosed systems, devices, and methods may be implemented in other manners. For example, the device embodiments described above are merely illustrative. For example, the division of units is only a division of logical function. In actual implementations, there may be another division manner, for example, multiple units or components may be combined or integrated into another system, or some features can be ignored or not executed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated unit is implemented in the form of a software functional unit and is sold or used as an independent product, which may be stored in a non-transitory computer-readable storage medium. Based on this understanding, the technical solution of the present disclosure contributes in essence or to the prior art, or all or part of the technical solution may be embodied in the form of a software product stored in a storage medium. There are it number of instructions for causing a computer device (which may be a personal computer, server, or network device, etc.) to perform all or part of the steps of the methods described in various embodiments of the present disclosure. The above-mentioned storage medium includes: a USB disk, a portable hard disk, a read-only memory (ROM), a random access memory (RAM), a magnetic disk, an optical disk, or other medium which can store program code.

The foregoing is only the specific embodiment of the present disclosure, while the scope of the present disclosure is not limited thereto. For those skilled in the art, various equivalent modifications or replacements that can be easily conceived within the technical scope of the present disclosure should be included within the scope of the present disclosure. Therefore, the scope of the present disclosure should be determined in accordance with the scope of the claims.

What is claimed is:

1. A computer-implemented robot charging control method for a robot, comprising executing on a processor the steps of:
    obtaining a linear distance between a charging portion of the robot and a charging station of a charging device, in response to detecting a charging instruction;
    determining polar coordinate information of a preset target position in a polar coordinate system taking the position of the charging portion as a pole based on the linear distance, wherein the preset target position and the charging station are on a same vertical line that is vertical to the charging station;
    moving the robot to the preset target position according to the polar coordinate information;
    rotating the robot in situ at the preset target position to a position the charging portion facing the charging station; and
    moving the robot from the preset target position to the charging station to establish an electrical connection for charging the robot between the charging portion and the charging station.

2. The method of claim 1, wherein the robot is further provided with a first communication antenna;
    wherein the step of obtaining a linear distance between a charging portion of the robot and a charging station of a charging device, in response to detecting the charging instruction comprises:
    calculating a first linear distance between the first communication antenna and the second communication antenna of the charging device based on the height of the first communication antenna and the height of the second communication antenna;
    calculating a second linear distance between the first communication antenna and the third communication antenna based on the height of the first communication antenna and the height of the third communication antenna of the charging device, wherein the distance between the second communication antenna and the charging station is equal to the distance between the third communication antenna and the charging station; and
    calculating the linear distance between the charging portion and the charging station based on the distance between the first communication antenna and the charging portion, the first linear distance, and the second linear distance.

3. The method of claim 2, wherein the step of calculating the first linear distance between the first communication antenna and the second communication antenna based on the height of the first communication antenna and the height of the second communication antenna comprises:
    calculating the first linear distance by the following formula:

$$L_1 = \sqrt{D_1^2 - (H_1 - H_2)^2};$$

where, $L_1$ is the first linear distance; $D_1$ is the length of a height difference reflection between the first communication antenna and the second communication antenna on a horizontal plane; $H_1$ is the height of the first communication antenna, where $H_1 > 0$; $H_2$ is the height of the second communication antenna, where $H_2 > 0$;
    wherein the step of calculating the second linear distance between the first communication antenna and the third communication antenna based on the height of the first communication antenna and the height of the third communication antenna comprises:
    measuring and calculating the second linear distance by the following formula:

$$L_2 = \sqrt{D_2^2 - (H_1 - H_3)^2};$$

where, $L_2$ is the second linear distance; $D_2$ is the length of a height difference reflection between the first communication antenna and the third communication antenna on a horizontal plane; $H_1$ is the height of the first communication antenna, where $H_1 > 0$; $H_3$ is the height of the third communication antenna, where $H_3 > 0$.

4. The method of claim 3, wherein the step of calculating the linear distance between the charging portion and the charging station based on the distance between the first communication antenna and the charging portion, the first linear distance, and the second linear distance comprises:
    calculating the linear distance by the following formula:

$$R = S + \frac{(L_1 + L_2)}{2};$$

where, R is the linear distance; S is the distance between the first communication antenna and the charging portion, where S≥0; $L_1$ is the first linear distance, $L_1$≥0; $L_2$ is the second linear distance, where $L_2$>0.

5. The method of claim 4, wherein the step of determining the polar coordinate information of the preset target position in the polar coordinate system taking the position of the charging portion as the pole based on the linear distance comprises:
determining a first pole diameter and a second pole diameter in the polar coordinate system, wherein the first pole diameter is equal to the linear distance, and the second pole diameter is equal to the distance between the charging station and the preset target position;
measuring and calculating a first polar angle corresponding to the first pole diameter and an included angle between the first pole diameter and the second pole diameter; and
calculating polar coordinate information of the target position in the polar coordinate system based on the first polar diameter, the second polar diameter, an angle of the first polar angle, and the included angle.

6. The method of claim 5, wherein the polar coordinate information of the preset target position comprises a third polar diameter and a second polar angle;
the step of calculating the polar coordinate information of the target position in the polar coordinate system based on the first polar diameter, the second polar diameter, the first polar angle, and the included angle comprises:
calculating the polar coordinate information of the preset target position by the following formula:

$$r = \sqrt{R^2 + 1 - 2R\cos(\alpha)} \text{; and}$$

$$\theta = \begin{cases} \beta + \arccos\left(\dfrac{R^2 + r^2 - 1}{2*R*r}\right) \\ \beta - \arccos\left(\dfrac{R^2 + r^2 - 1}{2*R*r}\right) \end{cases};$$

where, r is the third polar diameter; R is the first polar diameter; α is the included angle, $$-\frac{\pi}{2} > \alpha > \frac{\pi}{2};$$

where θ is the second polar angle; β is the first polar angle, −π>β>π or −0>β>2π.

7. The method of claim 5, wherein the step of rotating the robot in situ at the preset target position to a position the charging portion facing the charging station comprises:
obtaining a plurality of the linear distances while rotating the robot for one turn in situ at the target position;
utilizing a preset fitting model to fit each of the plurality of linear distances to obtain a plurality of fitting results, wherein the preset fitting model is a fitting model of a least squares based on sine function, the offset of the sine function is the linear distance, and the amplitude of the sine function is the distance between the first communication antenna and the charging portion;
determining the fitting result with a minimum value as a target distance; and
rotating the robot to a position the linear distance being equal to the target distance, such that charging portion faces the charging station.

8. A robot comprising:
one or more processors;
a memory; and
one or more computer programs stored in the memory and executed by the one or more processor, wherein the one or more computer programs comprises:
instructions for obtaining a linear distance between a charging portion of the robot and a charging station of a charging device, in response to detecting a charging instruction;
instructions for determining polar coordinate information of a preset target position in a polar coordinate system taking the position of the charging portion as a pole based on the linear distance, wherein the preset target position and the charging station are on a same vertical line that is vertical to the charging station;
instructions for moving the robot to the preset target position according to the polar coordinate information;
instructions for rotating the robot in situ at the preset target position to a position the charging portion facing the charging station; and
instructions for moving the robot from the preset target position to the charging station to establish an electrical connection for charging the robot between the charging portion and the charging station.

9. The robot of claim 8, wherein the robot further comprises:
a first communication antenna;
wherein the instructions for obtaining the linear distance between the charging portion of the robot and the charging station of the charging device, in response to detecting the charging instruction comprise:
instructions for calculating a first linear distance between the first communication antenna and a second communication antenna of the charging device based on the height of the first communication antenna and the height of the second communication antenna;
instructions for calculating a second linear distance between the first communication antenna and the third communication antenna based on the height of the first communication antenna and the height of a third communication antenna of the charging device, wherein the distance between the second communication antenna and the charging station is equal to the distance between the third communication antenna and the charging station; and
instructions for calculating the linear distance between the charging portion and the charging station based on the distance between the first communication antenna and the charging portion, the first linear distance, and the second linear distance.

10. The robot of claim 9, wherein the instructions for calculating the first linear distance between the first communication antenna and the second communication antenna based on the height of the first communication antenna and the height of the second communication antenna comprise:
instructions for calculating the first linear distance by the following formula:

$$L_1 = \sqrt{D_1^2 - (H_1 - H_2)^2};$$

where, $L_1$ is the first linear distance; $D_1$ is the length of a height difference reflection between the first communication antenna and the second communication antenna on a horizontal plane; $H_1$ is the height of the first communication antenna, where $H_1>0$; $H_2$ is the height of the second communication antenna, where $H_2>0$;

wherein the instructions for calculating the second linear distance between the first communication antenna and the third communication antenna based on the height of the first communication antenna and the height of the third communication antenna comprise:

instructions for measuring and calculating the second linear distance by the following formula:

$$L_2=\sqrt{D_2^2-(H_1-H_3)^2};$$

where, $L_2$ is the second linear distance; $D_2$ is the length of a height difference reflection between the first communication antenna and the third communication antenna on a horizontal plane; $H_1$ is the height of the first communication antenna, where $H_1>0$; $H_3$ is the height of the third communication antenna, where $H_3>0$.

11. The robot of claim 10, wherein the instructions for calculating the linear distance between the charging portion and the charging station based on the distance between the first communication antenna and the charging portion, the first linear distance, and the second linear distance comprise:

instructions for calculating the linear distance by the following formula:

$$R = S + \frac{(L_1+L_2)}{2};$$

where, R is the linear distance; S is the distance between the first communication antenna and the charging portion, where $S \geq 0$; $L_1$ is the first linear distance, $L_1 \geq 0$; $L_2$ is the second linear distance, where $L_2 \geq 0$.

12. The robot of claim 11, wherein the instructions for determining the polar coordinate information of the preset target position in the polar coordinate system taking the position of the charging portion as the pole based on the linear distance comprise:

instructions for determining a first pole diameter and a second pole diameter in the polar coordinate system, wherein the first pole diameter is equal to the linear distance, and the second pole diameter is equal to the distance between the charging station and the preset target position;

instructions for measuring and calculating a first polar angle corresponding to the first pole diameter and an included angle between the first pole diameter and the second pole diameter; and instructions for calculating polar coordinate information of the target position in the polar coordinate system based on the first polar diameter, the second polar diameter, an angle of the first polar angle, and the included angle.

13. The robot of claim 12, wherein the polar coordinate information of the preset target position comprises a third polar diameter and a second polar angle; and the instructions for calculating the polar coordinate information of the target position in the polar coordinate system based on the first polar diameter, the second polar diameter, the first polar angle, and the included angle comprise:

instructions for calculating the polar coordinate information of the preset target position by the following formula:

$$r = \sqrt{R^2+1-2R\cos(\alpha)}; \text{ and}$$

$$\theta = \begin{cases} \beta+\arccos\left(\frac{R^2+r^2-1}{2*R*r}\right) \\ \beta-\arccos\left(\frac{R^2+r^2-1}{2*R*r}\right) \end{cases};$$

where, r is the third polar diameter; R is the first polar diameter; α is the included angle, where $$-\frac{\pi}{2} > \alpha > \frac{\pi}{2};$$

θ is the second polar angle; β is the first polar angle, $-\pi > \beta > \pi$ or $-0 > \beta > 2\pi$.

14. The robot of claim 12, wherein the instructions for rotating the robot in situ at the preset target position to a position the charging portion facing the charging station comprise:

instructions for obtaining a plurality of the linear distances while rotating the robot for one turn in situ at the target position;

instructions for utilizing a preset fitting model to fit each of the plurality of linear distances to obtain a plurality of fitting results, wherein the preset fitting model is a fitting model of a least squares based on sine function, the offset of the sine function is the linear distance, and the amplitude of the sine function is the distance between the first communication antenna and the charging portion;

instructions for determining the fitting result with a minimum value as a target distance; and instructions for rotating the robot to a position the linear distance being equal to the target distance, such that charging portion faces the charging station.

* * * * *